(12) United States Patent
Egami

(10) Patent No.: US 7,607,499 B2
(45) Date of Patent: Oct. 27, 2009

(54) HYBRID VEHICLE CONTROLLER

(75) Inventor: Tsuneyuki Egami, Gamagori (JP)

(73) Assignee: DENSO Corporation, Kariya (JP)

( * ) Notice: Subject to any disclaimer, the term of this patent is extended or adjusted under 35 U.S.C. 154(b) by 642 days.

(21) Appl. No.: 11/131,291

(22) Filed: May 18, 2005

(65) Prior Publication Data

US 2005/0257968 A1 Nov. 24, 2005

(30) Foreign Application Priority Data

May 18, 2004 (JP) ............................. 2004-147263

(51) Int. Cl.
*B60W 10/00* (2006.01)
(52) U.S. Cl. .............. 180/65.265; 180/65.2; 180/65.21; 180/65.22; 180/65.275; 180/65.28; 180/65.285; 701/22; 903/930; 903/941; 903/942
(58) Field of Classification Search ................ 180/65.2, 180/65.3, 65.21, 65.22, 65.265, 65.275, 65.28, 180/65.285; 701/22; 903/930, 942, 941, 903/943
See application file for complete search history.

(56) References Cited

U.S. PATENT DOCUMENTS

| 5,755,302 | A * | 5/1998 | Lutz et al. ................ 180/65.21 |
| 5,907,191 | A * | 5/1999 | Sasaki et al. ................. 290/19 |
| 6,018,198 | A * | 1/2000 | Tsuzuki et al. ............... 290/17 |
| 6,203,468 | B1 * | 3/2001 | Nitta et al. ..................... 477/5 |
| 6,269,290 | B1 * | 7/2001 | Egami et al. .................. 701/22 |
| 6,307,277 | B1 * | 10/2001 | Tamai et al. .............. 290/40 C |
| 6,712,734 | B1 * | 3/2004 | Loeffler ........................ 477/5 |
| 6,784,563 | B2 * | 8/2004 | Nada ........................ 290/40 C |
| 6,819,985 | B2 * | 11/2004 | Minagawa et al. ............ 701/22 |
| 7,023,150 | B2 * | 4/2006 | Hisada et al. ................. 318/34 |
| 2002/0098941 | A1 * | 7/2002 | Minowa et al. ................ 477/5 |
| 2002/0117860 | A1 * | 8/2002 | Man et al. ..................... 290/46 |
| 2003/0163244 | A1 * | 8/2003 | Ando et al. .................. 701/112 |

(Continued)

FOREIGN PATENT DOCUMENTS

| JP | 11-22501 | 1/1999 |
| JP | 2000-87777 | 3/2000 |
| JP | 2000-213375 | 8/2000 |
| JP | 2003-244803 | 8/2003 |

OTHER PUBLICATIONS

Japanese Examination Report (with English translation) dated Jan. 23, 2007.

*Primary Examiner*—Christopher P Ellis
*Assistant Examiner*—Jacob Meyer
(74) *Attorney, Agent, or Firm*—Nixon & Vanderhye, PC

(57) ABSTRACT

A hybrid vehicle includes an internal combustion engine and a motor. A power split means splits a crankshaft power of the internal combustion engine into two drivelines to drive traction wheels of the vehicle using one of the drivelines. A generator is coupled to the other driveline such that torque of the motor is allowed to act upon the one of the drivelines to drive the traction wheels during operation of the motor. A controller includes motor drive mode determination means and control means. The motor drive mode determination means determines whether the vehicle is in a motor drive mode. The control means controls the torque produced in the generator in such a manner that if it is determined that the vehicle is in the motor drive mode, the torque to act upon the crankshaft from outside the internal combustion engine is generally zero.

14 Claims, 3 Drawing Sheets

U.S. PATENT DOCUMENTS

| | | | |
|---|---|---|---|
| 2004/0006419 A1* | 1/2004 | Kimura | 701/101 |
| 2004/0045751 A1* | 3/2004 | Aoki et al. | 180/65.2 |
| 2004/0084234 A1* | 5/2004 | Yatabe et al. | 180/65.2 |
| 2004/0173393 A1* | 9/2004 | Man et al. | 180/65.2 |
| 2004/0255904 A1* | 12/2004 | Izawa et al. | 123/352 |
| 2005/0082097 A1* | 4/2005 | Ichimoto et al. | 180/65.2 |

* cited by examiner

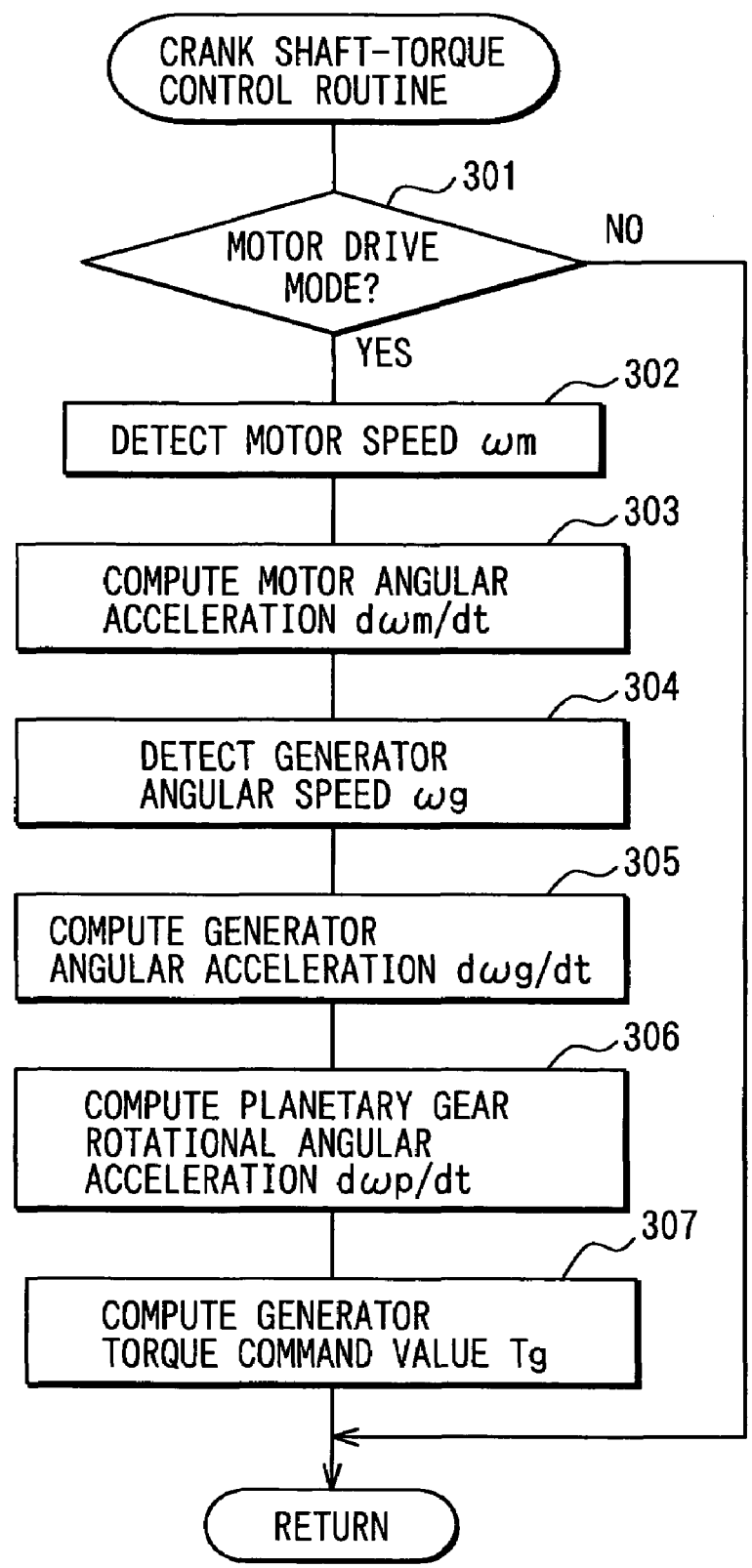

HYBRID VEHICLE CONTROLLER

CROSS REFERENCE TO RELATED APPLICATIONS

This application is based upon and claims the benefit of priority of Japanese Patent Application No. 2004-147263, filed on May 18, 2004, the contents of which are incorporated herein by reference.

FIELD OF THE INVENTION

The present invention relates to hybrid vehicles having an internal combustion engine and a traction motor as motive power sources and, more particularly, to a hybrid vehicle controller that provides an improved control scheme in a motor drive mode in which only the motor is used to drive the vehicle.

BACKGROUND OF THE INVENTION

In these environmentally aware times, there is an increasingly growing demand for hybrid vehicles which provide improved fuel economy and reduced exhaust gas emissions. Most of the hybrid vehicles now commercially available employ a drive scheme (of a so-called split type) described Japanese Patent Laid-Open Publication No. Hei 11-22501. Under low-speed and low-load conditions of the vehicle in which the fuel economy of the internal combustion engine is degraded, this drive scheme is adapted to improve fuel economy by driving the vehicle only by the motor with the internal combustion engine maintained at rest. On the other hand, when the high-voltage battery is in a low state of charge or under high-load conditions, this scheme is also adapted to start the internal combustion engine to drive the vehicle using the power from the engine. To launch and accelerate the hybrid vehicle from rest, the scheme is further adapted to accelerate the vehicle using the power from the motor, while starting the internal combustion engine using a generator during the launch and acceleration.

When the internal combustion engine is started using the generator, power is supplied from the high-voltage battery to the generator for motoring the internal combustion engine or part of split generator torque is transmitted to the driveshaft of the traction wheels as the vehicle is started. Thus, with no countermeasures taken against this, changes would occur in vehicle drive torque causing the driver to feel torque shocks. To address this problem, a system has been developed which cancels the generator torque transmitted to the driveshaft of the traction wheels with the motor torque in order to prevent changes in vehicle drive torque. When the internal combustion engine is started using the generator but not smoothly, such a system will experience motoring by the generator or increase in time for torque canceling by the motor, resulting in an increase in power consumption in the high-voltage battery. On the other hand, during the startup, the running drive power in the motor drive mode is sourced only from the high-voltage battery energy, thereby causing a further increase in power consumption in the high-voltage battery. This in turn may make it necessary to limit the running drive power in the motor drive mode depending on the capacity of the high-voltage battery, causing the driver to feel lack in power. Accordingly, it is a critical technical issue to provide an improved startup capability for the internal combustion engine of a split-type hybrid vehicle.

One of the conventional technologies for improving the startup capability of an internal combustion engine is disclosed in Japanese Patent Laid-Open Publication No. 2000-213375, entitled "Control method and apparatus for stopping internal combustion engines." The technique disclosed in this patent document is intended to improve the startup capability such that when the internal combustion engine stops, the crankshaft of the internal combustion engine is stopped at a predetermined crank position suitable for startup.

Applying the technique disclosed in this patent document mentioned above to the split-type hybrid vehicle may raise the following problems.

That is, the crankshaft may be stopped at a predetermined crank position when the internal combustion engine stops. However, when only the motor is used to drive the vehicle, a planetary gear mechanism coupling between the motor and the generator would cause the planetary gear of the planetary gear mechanism to rotate (on its axis) depending on the running speed, thereby causing the generator to rotate. Accordingly, a change in vehicle speed would correspondingly change the speed of the generator, thereby causing a reactive force due to generator inertia to act upon the crankshaft of the internal combustion engine. This reactive force may change the crank position of the internal combustion engine to dislocate the crank position from a suitable startup crank position. This may result in degradation in startup capability, thereby causing an increase in power consumption in the high-voltage battery. As described above, it will be thus necessary to limit the running drive power provided only by the motor, thereby causing the driver to feel lack in power. From the viewpoint of reduction in battery costs and vehicle weight, this problem will become more noticeable as the high-voltage battery mounted in the vehicle is reduced in capacity.

SUMMARY OF THE INVENTION

The present invention provides a hybrid vehicle controller which can prevent changes in crank position of the internal combustion engine to improve the startup capability of the engine while the vehicle is running in the motor drive mode in which only the motor is used to drive the vehicle. Furthermore, the present invention provides a hybrid vehicle controller which can satisfy the requirements for reducing the capacity of the high-voltage battery mounted in the vehicle.

One aspect of the present invention provides a controller for a hybrid vehicle. The hybrid vehicle includes an internal combustion engine and a motor, which are provided as power sources for driving the traction wheels of the vehicle. Also included are power split means for splitting the crankshaft power of the internal combustion engine into two drivelines to drive the traction wheels of the vehicle using one of the drivelines, and a generator coupled to the other driveline of the power split means. During the operation of the motor, the torque of the motor acts upon the one of the drivelines of the power split means to drive the traction wheels of the vehicle. The controller allows motor drive mode determination means to determine whether the vehicle is in a motor drive mode in which only the motor is used to drive the vehicle with the internal combustion engine at rest. If it is determined that the vehicle is in the motor drive mode, then the controller allows control means to control the torque produced in the generator so that the torque to act upon the crankshaft from outside the internal combustion engine is generally zero. During operation in the motor drive mode (with the internal combustion engine at rest), this arrangement allows the torque produced in the generator to be controlled so that the torque to act upon the crankshaft from outside the internal combustion engine is generally zero. Accordingly, in the motor drive mode (with the internal combustion engine at rest), it is possible to prevent the crank position of the internal combustion engine from being dislocated from a suitable startup crank position. It is thus made possible to improve the startup capability of the internal combustion engine as well as to eliminate an increase in power consumption in the high-voltage battery which conventionally resulted from degradation in startup capability. Thus, the controller can satisfy the requirements for reducing the capacity of the high-voltage battery mounted in the vehicle.

According to another aspect of the present invention, the control means of the controller may also include vehicle speed change detection means and generator torque command value computation means. More specifically, to control the torque produced in the generator, the vehicle speed change detection means senses a change in vehicle speed, and then the generator torque command value computation means computes a torque command value for the generator based on the change in vehicle speed (i.e., acceleration). When the motor drive mode determination means has determined that the vehicle is in the motor drive mode, the torque produced in the generator is controlled based on the torque command value for the generator. Thus, the controller may provide control so that the torque to act upon the crankshaft from outside the internal combustion engine is generally zero. In other words, while the generator is rotating at a speed corresponding to a running speed of the hybrid vehicle (the rotational speed of the driveshaft of the traction wheels), a change in the running speed would correspondingly change the speed of the generator, thereby causing generator inertial torque to act upon the crankshaft of the internal combustion engine. It is thus possible to compute the generator inertial torque acting upon the crankshaft of the internal combustion engine in accordance with a change in vehicle speed (or a change in generator speed). From this relationship, it is possible to set the torque command value for the generator to a value corresponding to the generator inertial torque in accordance with the change in vehicle speed (acceleration), thereby providing control such that the torque to act upon the crankshaft is generally zero. At this time, the inertial torque of the power split means can also be taken into account in addition to the generator inertial torque, thereby making the torque to act upon the crankshaft closer to zero with improved accuracy.

According to still another aspect of the present invention, the control means may also include generator speed change detection means to take it into account that a change in generator speed occurs in response to a change in vehicle speed (i.e., change in speed of the wheel driveshaft). More specifically, the generator speed change detection means may sense a change in generator speed, and then the torque command value for the generator may be set to a value corresponding to the generator inertial torque based on the change in generator speed, thereby providing control such that the torque to act upon the crankshaft is generally zero.

Alternatively, in a system which has the power split means configured to include a planetary gear mechanism with at least a planetary gear, the torque command value for the generator may also be set by considering the inertial torque of the power split means in addition to the generator inertial torque. In this case, the generator speed change detection means senses a change in generator speed, and motor speed change detection means senses a change in motor speed. Then, rotational speed change computation means computes a change in rotational speed of the planetary gear on its axis based on the changes in motor speed and generator speed. Based on the change in generator speed and the change in rotational speed of the planetary gear on its axis, the torque command value for the generator is then set to a value corresponding to the inertial torque of both the generator and the power split means. Control may be thus provided so that the torque to act upon the crankshaft is generally zero. In other words, the generator inertial torque can be computed once a change in generator speed is known, and likewise, the inertial torque of the planetary gear (the power split means) can be computed once a change in rotational speed of the planetary gear on its axis is known. Accordingly, this makes it possible to set the torque command value for the generator to a sum of the inertial torque of both the generator and the planetary gear in accordance with the changes in speed of the generator and in rotational speed of the planetary gear on its axis. It is thus possible to make the torque to act upon the crankshaft closer to zero with improved accuracy.

Other features and advantages of the present invention will be appreciated, as well as methods of operation and the function of the related parts from a study of the following detailed description, appended claims, and drawings, all of which form a part of this application. In the drawings:

BRIEF DESCRIPTION OF THE DRAWINGS

FIG. 4 is a flowchart of a crankshaft-torque control routine according to a third embodiment of the present invention.

DETAILED DESCRIPTION OF THE PREFERRED EMBODIMENTS

Now, descriptions will be given to three embodiments, first to third embodiments, which embody the best mode for carrying out the present invention.

Figure 1:
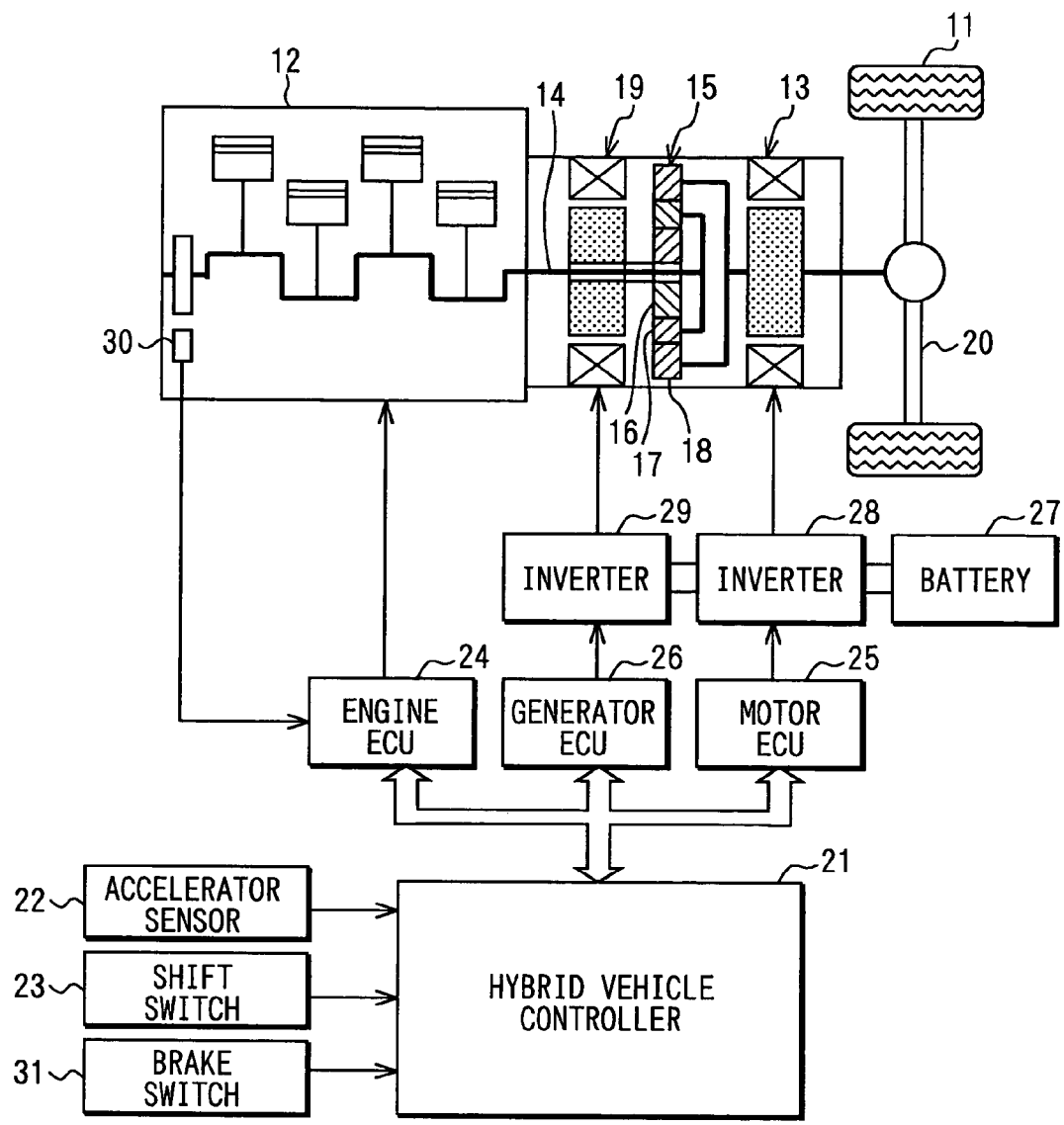
FIG. 1 is a schematic diagram of a hybrid-vehicle drive system according to the present invention.
Figure 2:
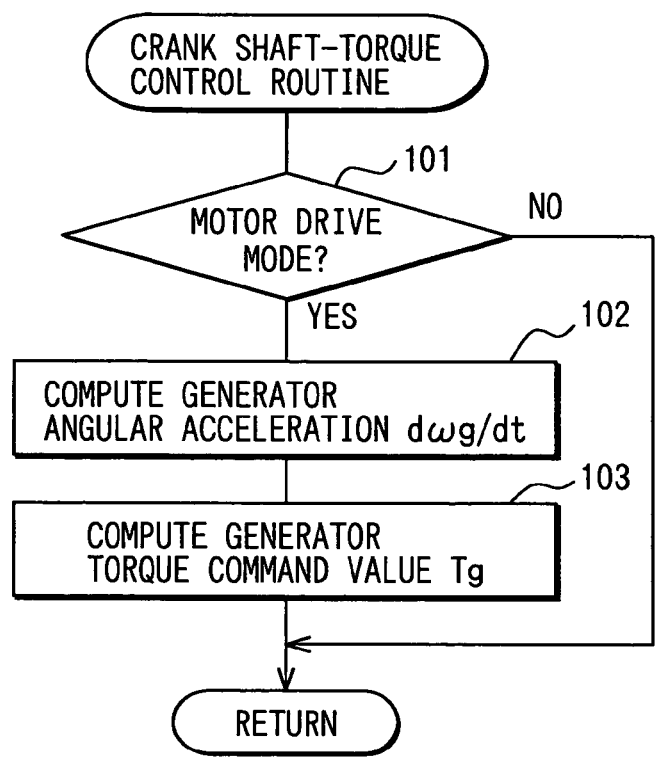
FIG. 2 is a flowchart of a crankshaft-torque control routine according to a first embodiment of the present invention.

The first embodiment of the invention will be described below with reference to FIGS. 1 and 2.

First, a drive system of a split-type hybrid vehicle will be described with reference to FIG. 1. As a power source for driving traction wheels 11 of the hybrid vehicle, the hybrid vehicle includes an engine 12 (an internal combustion engine) and a motor 13 (a motor generator). The power of a crankshaft 14 of the engine 12 is split into two drivelines through a planetary gear mechanism 15 which serves as power split means. The planetary gear mechanism 15 includes a sun gear 16 rotating at the center, a planetary gear 17 rotating on its axis and along the outer circumference of the sun gear 16, and a ring gear 18 rotating along the outer circumference of the planetary gear 17. The planetary gear 17 is coupled with the crankshaft 14 of the engine 12 via a carrier (not shown), the ring gear 18 being coupled with the rotational shaft of the motor 13, and the sun gear 16 being coupled with a generator 19 (a motor generator).

At the outset of the vehicle launch or during low-speed or intermediate-speed running (i.e., with the engine 12 reduced in fuel economy), the vehicle runs using only the power of the motor 13 with the engine 12 maintained at rest (i.e., in a motor drive mode). In this motor drive mode, the power of only the motor 13 is employed to drive a driveshaft 20 to rotate the wheels 11. At this time, part of the rotational force of the motor 13 is transmitted to the ring gear 18 of the planetary gear mechanism 15. Thus, the ring gear 18 rotates to allow the planetary gear 17 to rotate on its axis as well as the sun gear 16 to rotate, thereby causing the generator 19 to be rotationally driven. To start the engine 12 during the motor drive mode, the torque produced by the generator 19 acts upon the sun gear 16 of the planetary gear mechanism 15, thereby causing a change in the rotational speed of the planetary gear 17 along the outer circumference of the sun gear 16. This allows the crankshaft 14 of the engine 12 to be rotationally driven, thereby causing the engine 12 to start.

Under normal running conditions, to maximize the fuel economy of the engine 12, the power of the crankshaft 14 of the engine 12 is split into two drivelines through the planetary gear mechanism 15, i.e., into the generator 19 side and the driveshaft 20 side (or the rotational shaft side of the motor 13). The output of one of the drivelines is employed to drive the driveshaft 20 via the rotational shaft of the motor 13 to rotate the wheels 11, while the output of the other of the drivelines is employed to drive the generator 19. The electric power generated as such is supplied to the motor 13, allowing the wheels 11 to be also driven with the power of the motor 13.

Since the highest torque is required during hard acceleration, the power generated under normal running conditions and the DC power from a battery 27 are converted by an inverter 28 into AC power, which is in turn supplied to the motor 13 to drive the motor 13. This allows the driveshaft 20 to be driven with the power of both the engine 12 and the battery 27 to rotate the wheels 11, thus improving acceleration performance.

During deceleration or braking, the wheels 11 drive the motor 13 so that the motor 13 operates as a generator, thereby converting the braking energy of the vehicle into electric power to charge the battery 27.

Now, the configuration of the control system will be described below. A hybrid vehicle controller 21, which is a computer for controlling the hybrid vehicle, acquires output signals from various sensors and switches in order to sense the running condition of the vehicle and then determine a requested drive mode for issuance of a command. The sensors include an accelerator sensor 22 for sensing the throttle opening of the accelerator. The switches include a shift switch 23 for sensing the shift range of an automatic transmission and a brake switch 31 for sensing a braking action. The hybrid vehicle controller 21 communicates control signals between an engine ECU 24 for controlling the operation of the engine 12, a motor ECU 25 for controlling the operation of the motor 13, and a generator ECU 26 for controlling the operation of the generator 19. The hybrid vehicle controller 21 thus allows each of the ECUs 24 to 26 to control the operations of the engine 12, the motor 13, and the generator 19 in response to the required drive mode.

When a request for engine startup has been issued, the hybrid vehicle controller 21 outputs an engine startup command to the engine ECU 24 and the generator ECU 26. In response to this command, the generator ECU 26 causes an inverter 29 to convert the DC power of the battery 27 to AC power, which is then supplied to the generator 19 to drive the generator 19 and thereby crank the engine 12. Upon the cranking of the engine 12, the engine ECU 24 determines the engine cylinder into which fuel is to be injected for ignition in accordance with output signals from a cam angle sensor (not shown) and a crank angle sensor 30, thereby starting the engine 12.

On the other hand, when a request to stop the engine is issued during operation of the engine 12, the hybrid vehicle controller 21 outputs an engine stop command to the engine ECU 24. In response to this command, the engine ECU 24 stops the fuel injection and ignition so that the engine 12 is stopped at a predetermined crank position suitable for startup. Then, the hybrid vehicle controller 21 executes a crankshaft-torque control routine of FIG. 2, discussed later, in order to prevent the crank position of the engine 12 from being dislocated during the motor drive mode in which only the motor 13 is used to drive the vehicle. In the routine, a generator torque command value Tg is computed so that torque to act upon the crankshaft 14 from outside the engine 12 is generally zero. A signal indicative of the generator torque command value Tg is then delivered to the generator ECU 26, thereby providing control to the torque produced by the generator 19 such that the torque to act upon the crankshaft 14 from outside the engine 12 is generally zero.

Now, an explanation will be given to the contents of processing of the crankshaft-torque control routine of FIG. 2. This routine is executed at predetermined cycles during power-on of the hybrid vehicle controller 21, thus serving as control means which is defined in the appended claim. When initiated, this routine first determines in step 101 whether the vehicle is currently in the motor drive mode in which only the motor 13 is used to drive the vehicle with the engine 12 at rest. The processing performed in the step 101 serves as the motor drive mode determination means which is defined in the appended claim.

If the routine determines in step 101 that the vehicle is not currently in the motor drive mode, the routine is terminated without performing the subsequent processing. However, if the routine determines that the vehicle is currently in the motor drive mode, the routine proceeds to step 102, where an angular acceleration $d\omega g/dt$ indicative of change in speed of the generator 19 is computed. To compute the angular acceleration $d\omega g/dt$ of the generator 19 in a system equipped with a rotation sensor for sensing the angular speed $\omega g$ of the generator 19, a change in angular speed $\omega g$ over time of the generator 19 sensed by the rotation sensor may be calculated. For a system having no rotation sensor, the angular speed $\omega g$ of the generator 19 is estimated based on the running condition to calculate a change in the estimated value over time as the angular acceleration $d\omega g/dt$. The processing performed in the step 102 serves as the generator speed change detection means which is defined in the appended claim.

Thereafter, the routine proceeds to step 103, where the inertia Jg of the generator 19 is multiplied by the angular acceleration $d\omega g/dt$ to find a generator torque command value Tg by $$Tg = Jg \times d\omega g/dt.$$

The generator torque command value Tg corresponds to the torque caused by the inertia Jg of the generator 19 to act upon the crankshaft 14 of the engine 12. The inertia Jg of the generator 19 can be retrieved from those values which have been obtained in advance based on design data, experimental data or the like and which are stored in a ROM of the hybrid vehicle controller 21. The processing performed in the step 103 serves as the generator torque command value computation means which is defined in the appended claim.

The generator torque command value Tg computed in this manner is transmitted from the hybrid vehicle controller 21 to the generator ECU 26, which then provides control to the torque produced by the generator 19 such that the torque to act upon the crankshaft 14 from outside the engine 12 is generally zero.

In the first embodiment described above, during the motor drive mode, the torque produced in the generator 19 is controlled such that the torque to act upon the crankshaft 14 due to a change in speed of the generator 19 and the inertia Jg of the generator 19 is generally zero. Accordingly, in the motor drive mode (with the internal combustion engine at rest), it is possible to prevent the crank position of the engine 12 from being dislocated from a suitable startup crank position and thus improve the startup capability of the engine 12. It is also possible to eliminate an increase in power consumption in the battery 27 which conventionally resulted from degradation in startup capability. It is further possible to satisfy the requirements for reducing the capacity of the battery 27 mounted in the vehicle and for reducing the costs of the battery 27 as well as the weight of the vehicle.

In the aforementioned first embodiment, the angular acceleration dωg/dt of the generator 19 is multiplied by the inertia Jg to find the generator torque command value Tg. However, the second embodiment of the present invention shown in FIG. 3 takes into account that a change in speed of the generator 19 (the angular acceleration dωg/dt) occurs in response to a change in speed of the vehicle (acceleration dV/dt). Thus, in place of the angular acceleration dωg/dt of the generator 19, the vehicle acceleration dV/dt is used to find the generator torque command value Tg.

Figure 3:
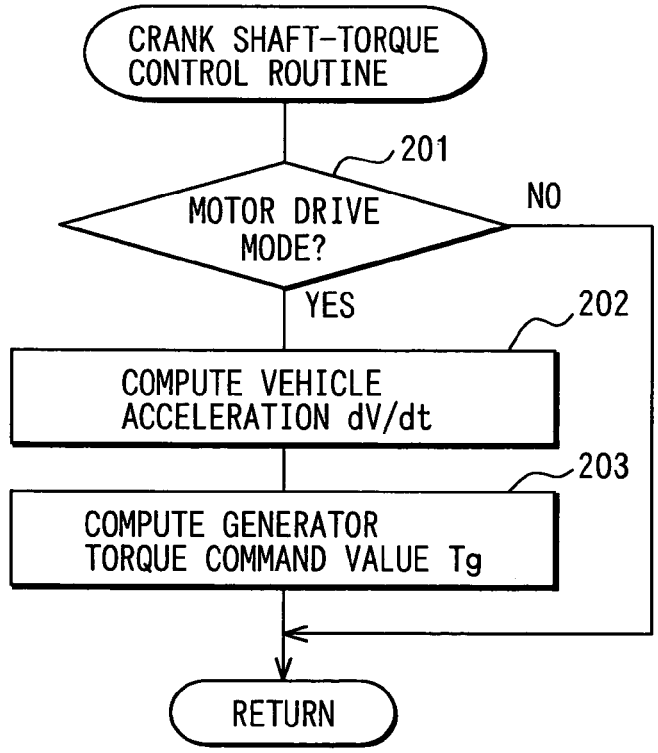
FIG. 3 is a flowchart of a crankshaft-torque control routine according to a second embodiment of the present invention.

The second embodiment follows a crankshaft-torque control routine of FIG. 3. In step 201, if the routine determines that the vehicle is currently in the motor drive mode, the routine proceeds to step 202, where a vehicle acceleration dV/dt indicative of a change in speed of the vehicle is computed. The vehicle acceleration dV/dt can be obtained by calculating over time a change in vehicle speed V sensed by a vehicle speed sensor (not shown). The processing performed in the step 202 serves as the vehicle speed change detection means which is defined in the appended claim.

Thereafter, the routine proceeds to step 203, where the inertia Jg of the generator 19 is multiplied by the vehicle acceleration dV/dt and a coefficient C to find the generator torque command value Tg by $$Tg = Jg \times C \times dV/dt,$$

where C is the coefficient for converting the vehicle acceleration dV/dt into the angular acceleration dωg/dt of the generator 19.

The second embodiment described above can also provide the same effects as those provided by the aforementioned first embodiment.

In the aforementioned first and second embodiments, only the torque caused by the inertia Jg of the generator 19 has been taken into account to compute the generator torque command value Tg. However, the third embodiment of the invention shown in FIG. 3 also takes it into account that torque caused by inertia Jp of the planetary gear 17 in the planetary gear mechanism 15 is present in addition to the torque caused by the inertia Jg of the generator 19. Thus, the torques caused by the inertia Jg and Jp of both the generator 19 and the planetary gear 17 are taken into account to compute the generator torque command value Tg.

The third embodiment follows a crankshaft-torque control routine of FIG. 4. In step 301, if the routine determines that the vehicle is currently in the motor drive mode, the routine proceeds to step 302, where the rotation sensor or the like senses an angular speed of the motor 13 (motor speed) ωm. Then, in step 303, the angular acceleration dωm/dt of the motor 13 is computed. The processing performed in the step 303 serves as the motor speed change detection means which is defined in the appended claim. Thereafter, the routine proceeds to step 304, where an angular speed of the generator 19 (generator speed) ωg is sensed. Then, in step 305, the angular acceleration dωg/dt of the generator 19 is computed. The processing performed in the step 305 serves as the generator speed change detection means which is defined in the appended claim.

Thereafter, the routine proceeds to step 306, where using the angular acceleration dωm/dt of the motor 13, the angular acceleration dωg/dt of the generator 19, and a gear ratio ρ, the rotational angular acceleration dωp/dt indicative of a change in rotational speed of the planetary gear 17 on its axis is calculated by the following equation;

$$d\omega p/dt = (d\omega m/dt - \rho \times d\omega g/dt) \times 2/(1-\rho),$$

where ρ is the gear ratio between the number of teeth of the ring gear 18 and that of the sun gear 16. The processing performed in the step 306 serves as the rotational speed change computation means which is defined in the appended claim.

Thereafter, the routine proceeds to step 307, where the generator torque command value Tg is calculated by the following equation;

$$Tg = Jg \times d\omega g/dt + Jp \times d\omega p/dt.$$

The generator torque command value Tg is a sum of the torque caused by the inertia Jg of the generator 19 and that of the inertia Jp caused by the planetary gear 17. The inertia Jg and Jp of the generator 19 and the planetary gear 17 can be retrieved from those values which have been obtained in advance based on design data, experimental data or the like and which are stored in the ROM of the hybrid vehicle controller 21.

In the third embodiment describe above, the generator torque command value Tg is set based on the torque caused by the inertia Jp of the planetary gear 17 in addition to that caused by the inertia Jg of the generator 19. Accordingly, it is possible to set the generator torque command value Tg to the sum of the torque caused by the inertia Jg and Jp of both the generator 19 and the planetary gear 17, thereby making the torque to act upon the crankshaft 14 closer to zero with improved accuracy.

What is claimed is:

1. A controller for a hybrid vehicle, the hybrid vehicle including: an internal combustion engine and a motor, which are provided as power sources for driving traction wheels of the vehicle; power split means for splitting a crankshaft power of the internal combustion engine into two drivelines to drive the traction wheels of the vehicle using one of the drivelines; and a generator coupled to the other driveline of the power split means, torque of the motor being allowed to act upon the one of the drivelines of the power split means to drive the traction wheels of the vehicle during the operation of the motor, the controller comprising:

motor drive mode determination means which determines whether the vehicle is in a motor drive mode in which only the motor is used to drive the vehicle with the internal combustion engine at rest; and control means which controls the torque produced in the generator in such a manner that if it is determined that the vehicle is in the motor drive mode, the torque to act upon the crankshaft from outside the internal combustion engine is generally zero.

2. The controller for a hybrid vehicle according to claim 1, wherein the control means comprises:

vehicle speed change detection means which senses a change in vehicle speed; and generator torque command value computation means which computes a torque command value for the generator based on the change in vehicle speed, and the control means controls the torque produced in the generator based on the torque command value for the generator when the motor drive mode determination means has determined that the vehicle is in the motor drive mode, so that the torque to act upon the crankshaft from outside the internal combustion engine is generally zero.

3. The controller for a hybrid vehicle according to claim 1, wherein the control means comprises:
generator speed change detection means which senses a change in generator speed; and
generator torque command value computation means which computes a torque command value for the generator based on the change in generator speed, and
the control means controls the torque produced in the generator based on the torque command value for the generator when the motor drive mode determination means has determined that the vehicle is in the motor drive mode, so that the torque to act upon the crankshaft from outside the internal combustion engine is generally zero.

4. The controller for a hybrid vehicle according to claim 1, wherein
the power split means is configured to include a planetary gear mechanism with at least a planetary gear;
the control means comprises:
generator speed change detection means which senses a change in generator speed;
motor speed change detection means which senses a change in motor speed;
rotational speed change computation means which computes a change in rotational speed of the planetary gear on its axis based on the changes in motor speed and generator speed; and
generator torque command value computation means which computes a torque command value for the generator based on the change in generator speed and the change in rotational speed of the planetary gear, and
the control means controls the torque produced in the generator based on the torque command value for the generator when the motor drive mode determination means has determined that the vehicle is in the motor drive mode, so that the torque to act upon the crankshaft from outside the internal combustion engine is generally zero.

5. A hybrid vehicle, comprising:
an internal combustion engine;
an electric motor;
a generator;
a power splitter including a first driveline operably connected to said electric motor and a second driveline operably connected to said generator; and
a controller for determining that the hybrid vehicle is in a motor drive mode, which includes said electric motor operating to propel said hybrid vehicle and said internal combustion engine resting, and controlling a torque generated by said generator such that a resultant torque applied to said crankshaft from outside said internal combustion engine is approximately zero.

6. The hybrid vehicle of claim 5, wherein said power splitter is disposed between said internal combustion engine and said electric motor and includes a plantetary gear set with a sun gear operably coupled to said generator and a ring gear operably coupled to said electric motor.

7. The hybrid vehicle of claim 5, wherein controlling said torque of said generator includes said controller computing a torque command value for the generator based on a change in vehicle speed.

8. The hybrid vehicle of claim 5, wherein controlling said torque of said generator includes said controller computing a torque command value for the generator based on a change in generator speed.

9. The hybrid vehicle of claim 5, wherein controlling said torque of said generator includes said controller computing a torque command value for the generator based on a change in generator speed and a change in a rotational speed of said power splitter.

10. The hybrid vehicle of claim 5, wherein the controller controls the torque generated by said generator such that the resultant torque applied to said crankshaft from outside said internal combustion engine is approximately zero if the controller determines that the hybrid vehicle is in the motor drive mode.

11. A method of controlling a hybrid vehicle, the hybrid vehicle including: an internal combustion engine and a motor, which are provided as power sources for driving traction wheels of the vehicle; a power splitter for splitting a crankshaft power of the internal combustion engine into two drivelines to drive the traction wheels of the vehicle using one of the drivelines; and a generator coupled to the other driveline of the power splitter, torque of the motor being allowed to act upon the one of the drivelines of the power splitter to drive the traction wheels of the vehicle during the operation of the motor, the method comprising:
determining whether the vehicle is in a motor drive mode in which only the motor is used to drive the vehicle with the internal combustion engine at rest; and
controlling the torque produced in the generator in such a manner that if it is determined that the vehicle is in the motor drive mode, the torque to act upon the crankshaft from outside the internal combustion engine is generally zero.

12. The method according to claim 11, wherein said controlling the torque comprises:
sensing a change in vehicle speed; and
computing a torque command value for the generator based on the change in vehicle speed, and
controlling the torque produced in the generator based on the torque command value for the generator when the determination has been made that the vehicle is in the motor drive mode, so that the torque to act upon the crankshaft from outside the internal combustion engine is generally zero.

13. The method according to claim 11, wherein said controlling the torque comprises:
sensing a change in generator speed; and
computing a torque command value for the generator based on the change in generator speed, and
controlling the torque produced in the generator based on the torque command value for the generator when the determination has been made that the vehicle is in the motor drive mode, so that the torque to act upon the crankshaft from outside the internal combustion engine is generally zero.

14. The method according to claim 11, wherein
the power splitter is configured to include a planetary gear mechanism with at least a planetary gear;
said controlling the torque comprises:
sensing a change in generator speed;
sensing a change in motor speed;
computing a change in rotational speed of the planetary gear on its axis based on the changes in motor speed and generator speed; and
computing a torque command value for the generator based on the change in generator speed and the change in rotational speed of the planetary gear, and
controlling the torque produced in the generator based on the torque command value for the generator when the determination has been made that the vehicle is in the motor drive mode, so that the torque to act upon the crankshaft from outside the internal combustion engine is generally zero.

* * * * *